March 2, 1965 L. KAY 3,172,075

APPARATUS FOR FURNISHING INFORMATION AS TO POSITIONING OF OBJECTS

Filed Jan. 2, 1962

6 Sheets-Sheet 2

SAWTOOTH GENERATOR.

POWER AMPLIFIER.

PRE-AMPLIFIER.

United States Patent Office 3,172,075
Patented Mar. 2, 1965

3,172,075
APPARATUS FOR FURNISHING INFORMATION AS TO POSITIONING OF OBJECTS

Leslie Kay, Rednal, England, assignor to National Research Development Corporation, London, England, a British corporation Filed Jan. 2, 1962, Ser. No. 163,811
11 Claims. (Cl. 340—1)

This invention relates to apparatus for detecting a distant object as by furnishing information relating to the position of the object with reference to an observer when normal direct visual perception of the object is difficult or impossible. The object may be solitary or it may be one of two or more objects which may be at different distances and in different directions from the observer. Where the object is one of two or more objects, the apparatus will provide for the detection of any one thereof and provide for the observation of each of the objects in such a manner as to give information relating to their location relative to one another and to the observer.

The invention has been developed primarily in the form of an apparatus for aiding blind persons to detect and locate objects in their paths of intended movement. The invention may however be applied in other fields, for example, to an apparatus to enable objects to be detected and located at night (without the necessity of utilising a source of illumination) and in conditions of fog.

A form of apparatus in accordance with the invention which is especially suitable for aiding blind persons and which makes use of acoustic wave energy comprises a means for generating a carrier wave, means for varying the frequency thereof cyclically through a range of values, means for radiating acoustic wave energy of the frequency of said carrier wave to a field of view, means for receiving reflections of said acoustic wave energy from an object in said field of view including at least one receiving channel, modulator means in said channel, means for feeding a local signal to said modulator means of a frequency varying cyclically in conformity with that of said carrier wave to heterodyne with an incoming signal in said channel and produce a beat signal of difference frequency varying through a range of values as the range of the object varies from maximum to minimum, and means for presenting said beat signal in readable form, said range of values through which said carrier wave frequency is varried being a plurality of times greater than that through which said difference frequency varies.

In the application of the invention in other fields where the wave energy need not necessarily be acoustic wave energy, the receiving means of the apparatus preferably includes two receiving elements having directional receptivities represented by polar lobes both extending forwardly into said field of view, the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said said carrier wave to heterodyne with an incoming signal in each of said channels and produce respective beat signals therein of a difference frequency varying through a range of values as the range of the object varies from maximum to minimum and differs for the two channels whenever the object is offset laterally from said reference axis, and means for presenting said beat signal in a form in which frequency disparity between said beat signals in said two channels is readable.

As applicable to the preferred form of apparatus the expression "signal in readable form" is to be deemed to mean a signal which is so furnished that the difference of frequency, if any, of the received signals in the respective channels is capable of sensory perception by the user; e.g. by the auditory neural system or visually as appropriate.

In forms of the apparatus wherein the provision of an indicator means furnishing a visually readable signal is appropriate, that is to say where the apparatus is intended for use by other than blind persons, the indicator means may include a display device such as one or more cathode ray tubes on which a signal or signals is or are displayed furnishing either both range and directional information in the same signal or range and directional information in different signals, such display being effected in corelation to appropriate time bases to enable positional coordinates of a particular object detected by the apparatus to be ascertained by the user.

The apparatus is intended, however, primarily to be used in cases where the user is able only to receive audibly communicated intelligence (as in the case of blind persons) or to receive intelligence in this form more conveniently than in a visual form because of the occupation of the user's visual senses in some other way (for example in the case of driving or navigating a vehicle at night or under conditions of fog).

A further feature of the apparatus is that cyclic variation of frequency may be such as to produce a marking signal present in the audible output. Thus the cyclic variation of frequency may be represented by a frequency-time characteristic including a time spaced series of linearly or approximately linearly rising or falling portions and intervening connecting portions, as for instance a characteristic saw-toothed form.

In the last described case, aural indicator elements associated operatively with respective channels furnish signals between which there is a time difference when the object is offset laterally from the reference axis.

It will be understood that a user is able to detect without difficulty a time difference in the signals received and presented to the left ear relatively to those received and presented to the right ear, and this time difference can be nullified, or reduced to zero, by appropriate movement of the receiving elements by the user to assist in determining the direction of the object from which the wave energy is reflected.

This is supplementary to the indication as to the direction of an object resulting from the production of an audibly readable signal consisting of two sounds of different frequency furnished by the aural indicator elements when the object is off the reference axis.

It will be understood that the user will normally rotate the receiving elements to eliminate the frequency difference and the time difference between the signals.

In one form of the apparatus, suitable for use as an aid to the blind, the receiving elements may be provided with mounting means for wearing on the head of the user. The receiving elements may be so positioned on the mounting means that when the latter is placed on the user's head the receiving elements occupy positions spaced apart laterally of the normal line of sight. The transmitting means may also include a transmitting element which is provided with mounting means for wearing on the head of the user; preferably the transmitting and receiving elements are all mounted on a common head mounting set.

It will be understood that in using the apparatus in this form, the user will turn his or her head towards the appropriate direction to obtain information as to the direction of the target in order to eliminate any frequency difference in the audibly readable signals, eliminate any amplitude difference in these signals if such exists and to eliminate any time lag in the signals. Range of an object will be determined by the frequency of the audibly readable signals.

The invention will now be described, by way of example, with reference to the accompanying drawings wherein.

Figures 1, 2:
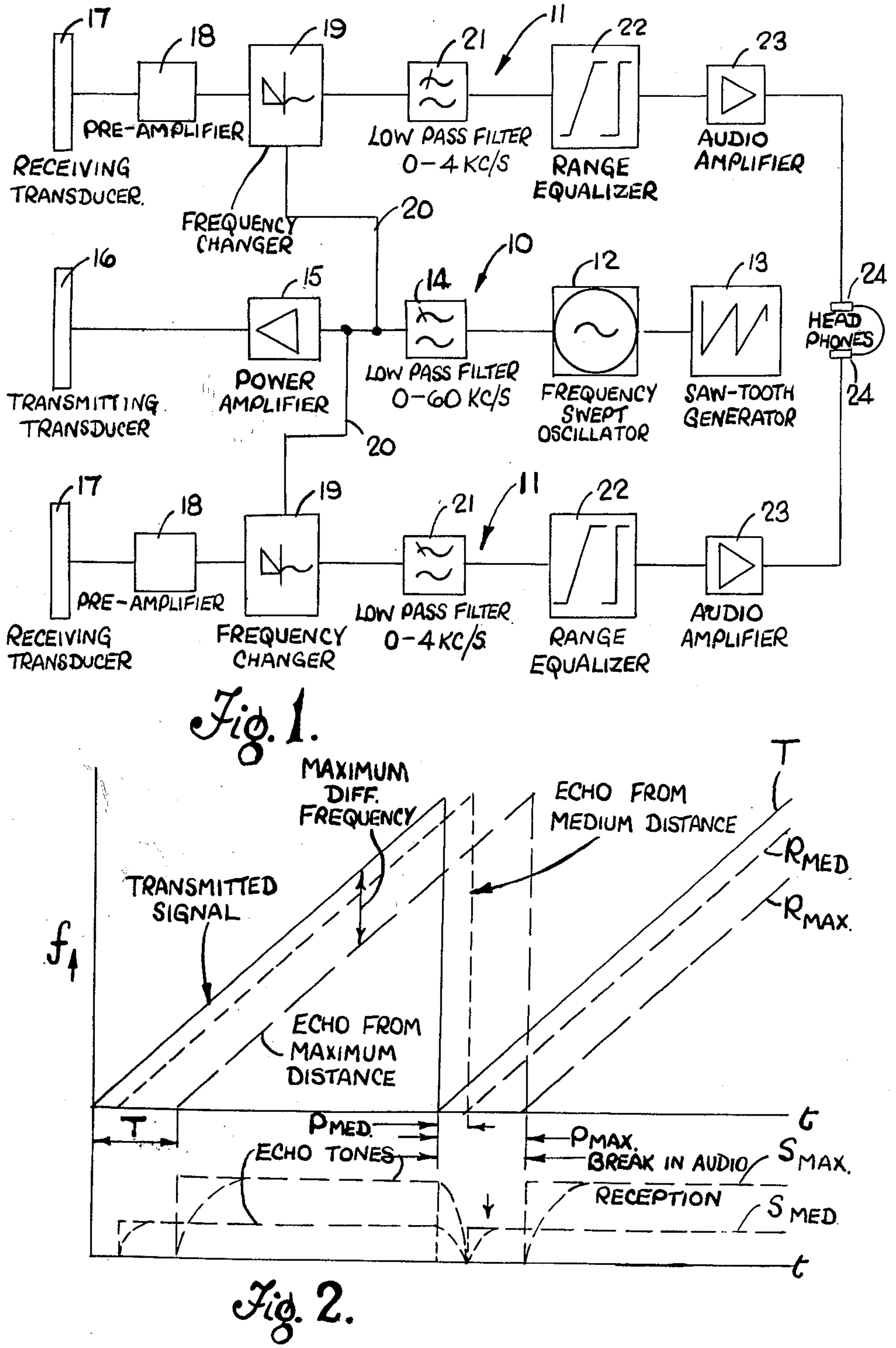
FIGURE 1 is a schematic circuit diagram showing one form of the apparatus suitable for use as an aid to blind persons.
FIGURE 2 is a graph illustrating a typical form of cyclic variation of frequency of the transmitted signal, and the relationship of the latter to the received signal for reflections from objects beyond the maximum distance and medium distance.

Referring firstly to FIGURE 1 the apparatus there shown comprises a transmitting channel indicated generally at 10 and two receiving channels indicated generally at 11.

The transmitting channel includes a frequency swept oscillator 12, the modulating signal for which (producing the frequency sweep) is furnished by a saw-tooth generator 13. The output of the frequency swept oscillator is fed through a low pass filter 14 to a power amplifier 15 and thence to a transmitting element in the form of a transmitting transducer 16.

The carrier frequency at which the oscillator 12 operates is in the ultrasonic range, the electrically generated signal fed along the transmitting channel to the transducer 16 being converted thereat into sound waves (of above audible frequency) which are radiated into the space which forms the field of view of the apparatus, hereinafter referred to in greater detail.

Each of the receiving channels 11 includes a receiving element in the form of a receiving transducer 17 for converting the reflected sound wave signal received thereat into an electrical signal which is fed to a pre-amplifier 18 and thence to a frequency changer or modulator 19.

The frequency changer or modulator 19 is also fed with a signal derived from the frequency swept oscillator 12 along feed lines 20, and there will be a frequency difference between the incoming received signal and the locally generated signal due to the time taken for the transmitted signal to travel out to an object and back again.

The magnitude of the frequency difference will be dependent upon the range of the object.

The difference of frequency between that of the incoming carrier and that of the locally generated signal is separated from other components of the modulated signal fed out from the frequency changers 19 by a low pass filter 21 included in each channel which passes only signal components of difference frequency.

Each receiver channel includes a range equalizer 22, the function of which is to provide amplification of the filtered variable frequency signal and to afford a gain which increases with the frequency of this signal, so as to compensate for the greater attenuation which will occur during the outward and return passage of the sound waves as the range of the object causing the reflection is increased.

The outputs of the range equalizers are fed through audio amplifiers 23 to sound reproducing elements such as head phone elements 24.

The general manner of operation of the apparatus is illustrated graphically in FIGURE 2. In FIGURE 2 the transmitted signal is represented by the full line curve T in which the frequency of the signal $f$ is shown as an ordinate against time $t$. It will be observed that the transmitted signal comprises a plurality of time spaced portions which increase linearly and are connected by sharply decreasing or nearly vertical portions, so that it is of the general form of saw-tooth wave.

A signal received from the extreme range of detection is represented by the curve $R_{max.}$ shown as a "long dashed" line, whilst the signal received from an object situated at an intermediate range is represented by the curve $R_{med.}$ shown by a "short dashed" line.

The maximum frequency difference is represented by the value of the ordinate between the curves T and $R_{max.}$ In the lower section of FIGURE 2 there are shown two curves of beat signal that is, signal fed out to the head phones 24 plotting frequency $f$ as ordinate against time $t$. The curve $S_{max.}$ represents the signal produced from an object at maximum range, i.e. corresponds to the curve $R_{max.}$ and the curve $S_{med.}$ similarly corresponds to the curve $R_{med.}$ in the upper part of FIGURE 2.

It will be observed that in both cases the signals $S_{max.}$ and $S_{med.}$ comprise relatively long sustained pulses of constant frequency (of a value dependent upon range) separated from each other by blank periods $P_{max.}$ and $P_{med.}$, which result when the incoming signal fed to a frequency changer is derived from the upper portion of one tooth of the saw-tooth transmitted signal and the locally generated signal is derived from the lower portion of the next succeeding tooth. The combination of these two components temporarily reduces the signal $S_{max.}$ and the signal $S_{med.}$ to zero, because the difference frequency is outside the pass-band of filters 21. The reduction of these signals to zero constitutes a marking signal and is apparent in each of the ear phones 24 as a "beat" or "thump."

Range estimation by the user of the apparatus is achieved by recognition of the frequency of the signal $S_{med.}$ A secondary indication will also arise from the duration of the blank or marking signal occurring between pulses of indication signal $S_{med.}$ Reflections from objects at different distances received concurrently will produce a complex tone having a number of frequency components corresponding to the number of reflecting objects.

The user will, as a result of experience, come to recognize the presence of objects at different ranges, and will be able to form an approximate estimation as to the ranges of the various objects in his or her path.

Information as to the direction of the object from which reflection takes place is achieved without the necessity for forming a narrow pencil-like receiver "beam" such as would be afforded, for example, by a strip array of receiving transducer elements and which would require some means to effect scanning of the "beam" in azimuth and possibly also in elevation which would entail considerable complication in the circuits of the receiving means. The arrangement now described utilizes only two receiver channels 11 and the receiver elements 17 associated operatively therewith whilst having some directivity, each afford a comparatively broad polar lobe both in azimuth and in a vertical plane so that for practical purposes, the field of view of the apparatus extends without substantial diminuition in range over a "solid angle" facing forwardly of the receiving elements of nearly 180° in any plane.

Directional information is obtained by making use of the innate properties of the human auditory neural system which is able to discriminate without difficulty between tones or frequencies of different values furnished respectively by the earphones 24 and applied to left and right ears respectively.

The time delay between the arrival of a signal at one of the receiving element 17 for example that situated on the left hand side of the field of view as compared with that situated on the right hand side can be perceived by the user, although the time interval is relatively short for moderate lateral spacings of the receiving elements. This time difference is also transformed into a frequency difference, and readable signals within the audible range and having a corresponding frequency difference which is maintained at a constant value a given range and direction of object, are presented to the user's left and right ears. This condition, that is the presence of both a time difference and a frequency difference is easily recognized, and the receiving element collectively can be oriented by the user to remove the frequency difference.

Figure 3:
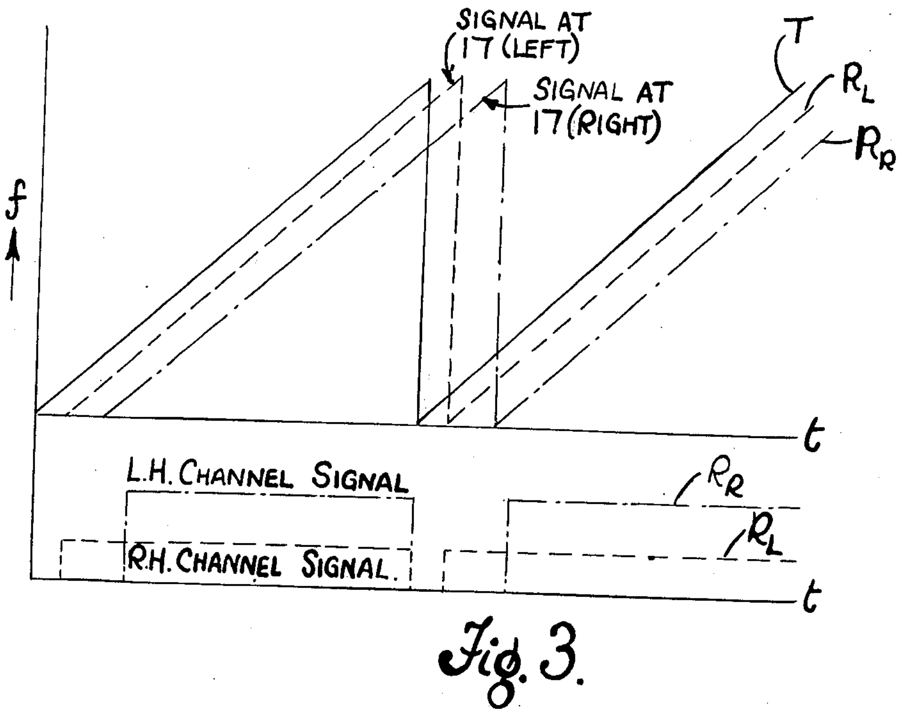
FIGURE 3 is a graph similar to FIGURE 2 illustrating signals received from an object which is situated off a reference axis of the receiving elements and illustrating the modulated beat signals of constant difference frequency developed in the two receiving channels.

The frequency relationships of the signals fed initially to the two channels from receiving elements 17 and later developed therein to a constant frequency in each channel (for a given range and direction) are illustrated in FIGURE 3. The signals initially received are indicated in the upper part of FIGURE 3 as are $R_L$, $R_R$, where the object is situated to the left of the reference axis which is assumed to be the perpendicular bisector of a line joining the two receiving elements 17.

The signals of constant difference frequency are shown in the lower part of FIGURE 3 and it will be observed that these are of pulsed form with short intervals interrupting the longer pulses contained in each signal. It will be understood that signals represented by $R_{med.}$ in FIGURE 2 will in fact consist of two separate signals such as $R_L$ and $R_R$ in all cases where the object forms the reflection is received is situated at a position offset laterally from the reference axis.

The user will be able to perceive firstly a frequency difference between these two signals, secondly a time staggered relationship between the reception of the leading wave fronts of the pulses incorporated in signals $S_{med.}$ in the two channels, and thirdly there will possibly also be some amplitude difference due to directivity of the receiving transducers. Further, if the compensation provided by the range equalizers 22 is not complete, this will also produce a difference of amplitude.

The user will thus re-orient the receiving elements 17 collectively to eliminate these differences and when so oriented will be aware that the receiving elements are then collectively directed towards the object.

If desired, the thudding effect of the marking signals which intervene between the pulses of the signals $S_{med.}$ may be reduced to a comfortable level by shaping the leading and trailing edges of the pulses, as indicated in dotted lines in FIGURE 2. This may be achieved at any convenient point in the receiving channels, for example, in the audio amplifiers or in the range equalizers. This may be done by designing these to have a gain which reduces towards the limits of bandwidth required to accommodate harmonics corresponding to steeply rising and falling wave fronts of the pulses.

Figure 4:
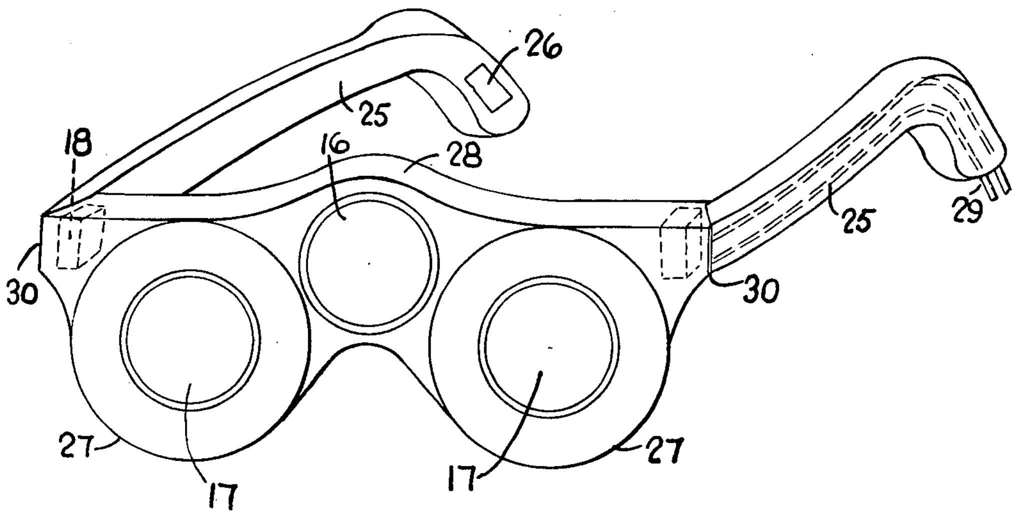
FIGURE 4 is a perspective view showing one form of head set incorporating transmitting and receiving elements and aural indicator elements.

Referring now to the arrangements for mounting the transmitting and receiving elements and head phones, there is shown in FIGURE 4 a head set of spectacle form which forms the mounting means for these elements and the head phones.

The arms 25 of the spectacle head set may incorporate bone-conduction sound reproducers as indicated at 26, these being of the normal hearing aid type.

The eye piece frames 27 of the spectacles may have mounted therein the receiving elements 17 in the form of transducers, and the bridge piece 28 may incorporate a cavity in which is mounted the transmitting element 16 also in the form of a transducer.

The requisite connecting wires may be embedded in the arms 25 and in the unit which comprises the frames 27 and the bridge piece 28, such wires emerging as indicated at 29 for connecting to such circuits which are not conveniently carried by or mounted on the head set itself.

The arms 25, which are pivotally mounted with regard to the frames 27, may be urged inwardly towards each other by spring means (not shown) such as torsion springs incorporated in the hinges provided at the positions 30.

If desired, the unit 27, 28 may incorporate cavities in the localities 30 in which the pre-amplifiers 18 are mounted.

Figure 5:
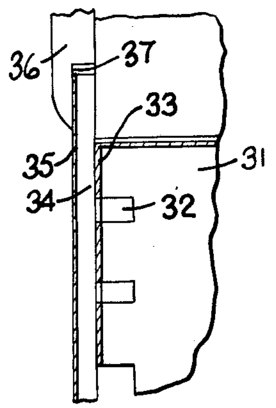
FIGURE 5 is an enlarged fragmentary cross-sectional view showing constructional details of the receiving elements.

The transducers 16 and 17 may be of known capacitive type, the constructional details being shown diagrammatically in FIGURE 5. Thus each transducer may comprise a block 31 of relatively hard insulating material formed with spiral or concentric grooves 32 which may typically be of the order of 0.1 millimetre deep. In between the grooves, the forwardly presented face of the block 31 is coated with a metal film 33 e.g. aluminium, which in the case on concentric grooves would be continued over the faces of the grooves to provide for connection of the annular sections of the film to each other.

Overlying the front face of the block 31 is a film 34 of insulating material such as "melinex," typically having a thickness of 50 to 100 microns, the outer face of which is coated with metal as indicated at 35, and which again may be aluminium.

Electrical connections are made to the metal film 33 and coating 35. In the case of the coating 35 this may be affected by means of a clamping ring 36 having a metalised rebate 37 engaging the metalising 35. In the case of the film 33 this may be continued along the side faces of the block 31 where contact may be made by the film 33 with one of the moulded in or embedded leads 25.

Further details of construction and operating characteristics of this type of transducer are disclosed in "Acustica," volume IV, 1954, No. 5.

It will be understood that, instead of incorporating the transducer elements and hearing aids in a single head set, each or any group of these elements and aids could be individually mounted. Thus there would be provided a suitable attachment member to enable the individual element or aid, or a group thereof to be worn on the head or other appropriate part of the person. For example, the receiving and transmitting transducers could be incorporated in a garment of the type worn on the head such as a cap or hat. Alternatively, the "spectacle" construction of head piece may be used for mounting the transducer elements alone.

Alternatively, the receiving and/or transmitting transducers may be attached to or incorporated in a garment worn on the body such as a jacket or a belt.

The hearing aids may be individually mounted on or adjacent to the user's ears by providing bodies for the hearing aids capable of fitting in or on the user's ears in the known manner of hearing aids.

Whatever construction is adopted, the materials employed for the head set and the individual mounting members are preferably made of a lightweight material.

Figure 6:
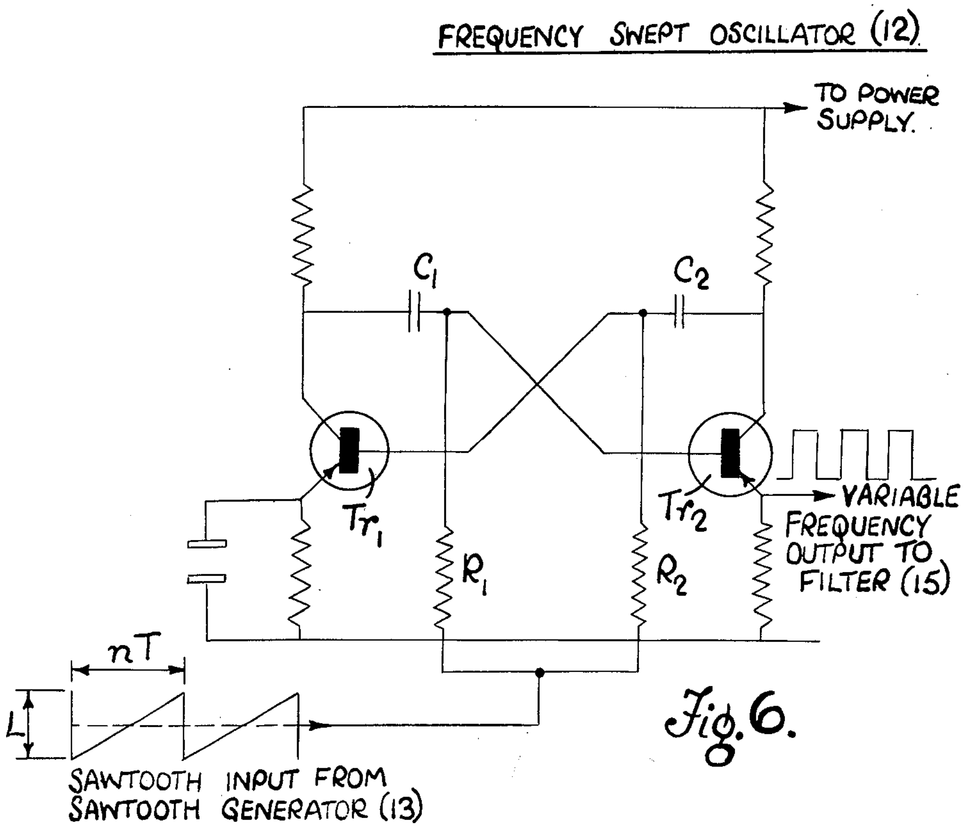
FIGURE 6 shows one suitable form of frequency modulator oscillator for incorporation in the transmitting channel.

Referring now to the individual units shown generally in FIGURE 1, and firstly to the circuit diagram of FIGURE 6, the frequency swept oscillator may comprise a multi-vibrator circuit incorporating transistors $Tr_1$ and $Tr_2$ with the base of each connected to the collector of the other through capacitors $C_1$ and $C_2$. The bases of the transistors are fed with a saw-toothed input wave form through resistors $R_1$ and $R_2$. The values of the capacitors $C_1$ and $C_2$, and resistors $R_1$ and $R_2$ determine the mid-frequency of the sweep, and the extent of sweep and the rate of change of frequency of the sweep is determined by the saw-tooth input of voltage at the junction of the resistors $R_1$ and $R_2$.

The output from the emitter of the transistor $Tr_2$ is of square, or approximately square, wave form, and harmonics of the fundamental are attenuated by the low pass filter 14.

Figure 7:
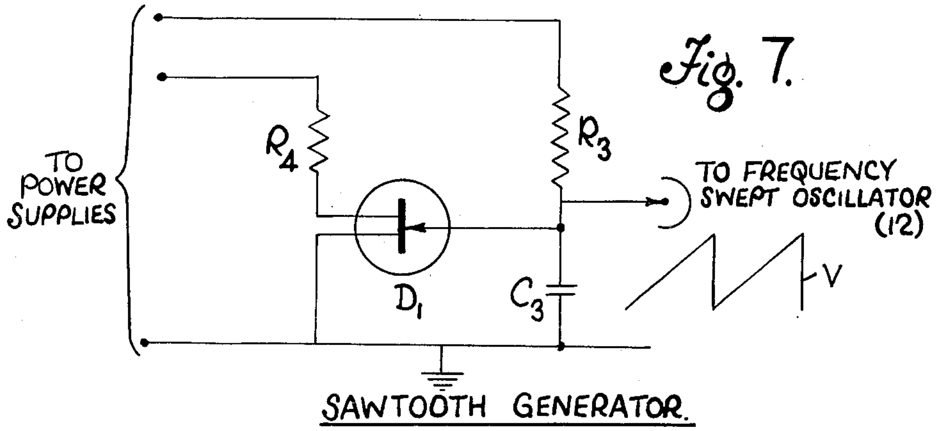
FIGURE 7 is a circuit diagram of one suitable form of saw-tooth generator for supplying the modulating signal to the oscillator, shown in FIGURE 5.

Referring now to FIGURE 7, the saw-tooth controlling voltage is produced by a saw-tooth generator comprising a double-based diode $D_1$ (of the semi-conductor type) connected in parallel with a capacitor $C_3$ which can charge through a resistor $R_3$ until the voltage rises to the discharge point, as indicated by the output wave form V, which is applied to the junction of resistors $R_1$ and $R_2$.

Typically, the charging voltage applied across the circuit $R_3C_3$ may be 50 volts D.C., and the voltage applied across the circuit $R_4D_1$ may be 4.5 volts D.C.

Figure 8:
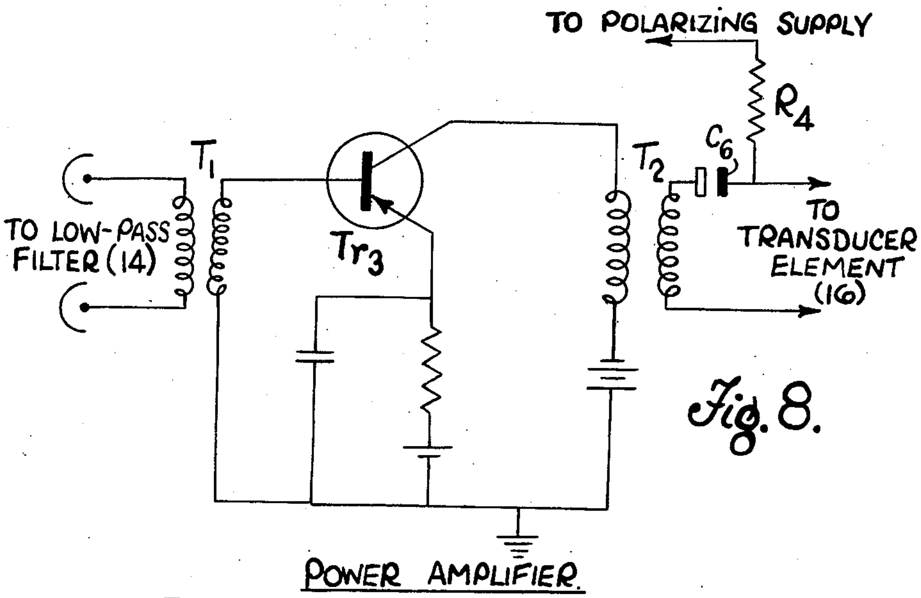
FIGURE 8 is a circuit diagram of one suitable form of power output station for receiving and amplifying the output from the oscillator of FIGURE 5.

From the filler 14 (FIGURE 1) the signal is coupled to the imput of a power amplifier circuit of the transistor type, as shown in FIGURE 8. In this circuit a transistor $Tr_3$ is inductively coupled both to the output of the filter 14 by transformer T, and to the transmitting transducer elements through transformer $T_2$, the output circuit of capacitor $C_6$ being connected to a polarizing voltage of typically 50 volts D.C. through a resistor $R_4$.

Whilst there is considerable flexibility as to the choice of the frequency sweep, it is preferred that the range of frequencies for indication signal, i.e. that furnished to the head phones 24 shall be within that part of the audible range within which the ear can distinguish most readily between one frequency and another.

In the particular example now described, the frequency range of the signal fed to the head phones 24 is from 100 to 4000 cycles, the upper limit being determined by the cut-off frequency of the low pass filters 21.

It will be evident from FIGURE 2 that the form of the ordinate drawn between the curves T and $R_{max.}$ is determined by the slope of the rising portions of these curves, and hence by the rate of frequency sweep of the oscillator 12.

Consequently, having determined the upper limit of frequency of the indication signal to be furnished to the head phones 24, the rate of change of frequency sweep is then fixed in accordance with the maximum range of objects to be detected. The choice of mid-carrier frequency for the frequency swept oscillator is determined by considerations such as performance of the apparatus in terms of maximum range which can be achieved for a given power at different carrier frequencies, and by the duration of the frequency sweep, that is to say, the lengths of the pulses incorporated signals $S_{med.}$ which it is required to provide in the ear phones.

In considering this latter factor, it is desired that the length of the signal shall be great relatively to the blank or marking signal. This avoids confusion between the frequency of the "tone" occurring during the pulse or "on" period of the signal $S_{med.}$ and the fundamental frequency corresponding to the square wave form of the signal $S_{med.}$ itself, comprising the pulses and blank spaces.

In the case now described, the mid-carrier frequency is 50 kc./s. and the frequency sweep is 20 kc./s. so that the oscillator frequency varies linearly with time of a frequency range of 40 kc./s. to 60 kc./s. whereby the value of the highest carrier frequency is one half an octave higher than the value of the lowest carrier frequency. It will be evident that this is a plurality of times greater than the range of values through which the frequency of the signal furnished by the ear phones changes as the range of the object varies from maximum to minimum distance.

It will be understood that the rate of sweep of the oscillator 12 may be increased, if desired, to enable greater discrimination to be achieved for the same band of frequencies fed to the ear phones 24. In this case the apparatus will then operate over a smaller maximum detection range. It would be possible for example to provide a switching arrangement to substitute different values of resistor $R_3$ in the saw-tooth generator 13 to enable a user at will to convert the apparatus to shorter range working with greater discrimination.

It will be understood that the maximum possible detection range will be determined by attenuation of the radiated wave energy in travelling to and from the object. Normally however it is limited by the upper limit of the difference frequency which can pass through the receiving channels. In any case this cannot be above the upper audible limit when ear phones are used as the indicator means.

Figure 9:
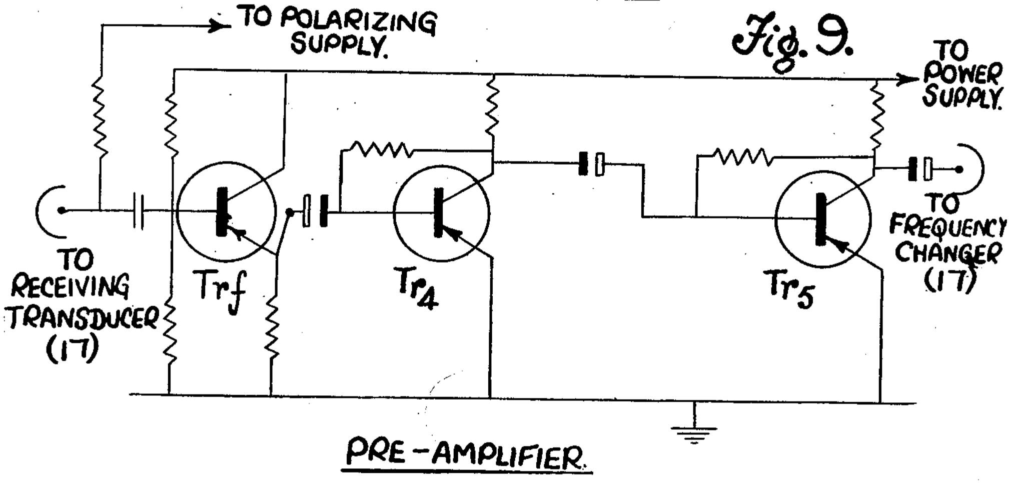
FIGURE 9 is a circuit diagram of one suitable form of emitter follower and pre-amplifier for incorporation in each of the receiving signal channels.

Referring now to FIGURE 9 showing the circuit of each of the receiver channels, the preamplifier 18 may be of generally conventional form and comprise an emitter follower $Tr_f$ and resistance capacity coupled transistors $Tr_4$ and $Tr_5$.

Figure 10:
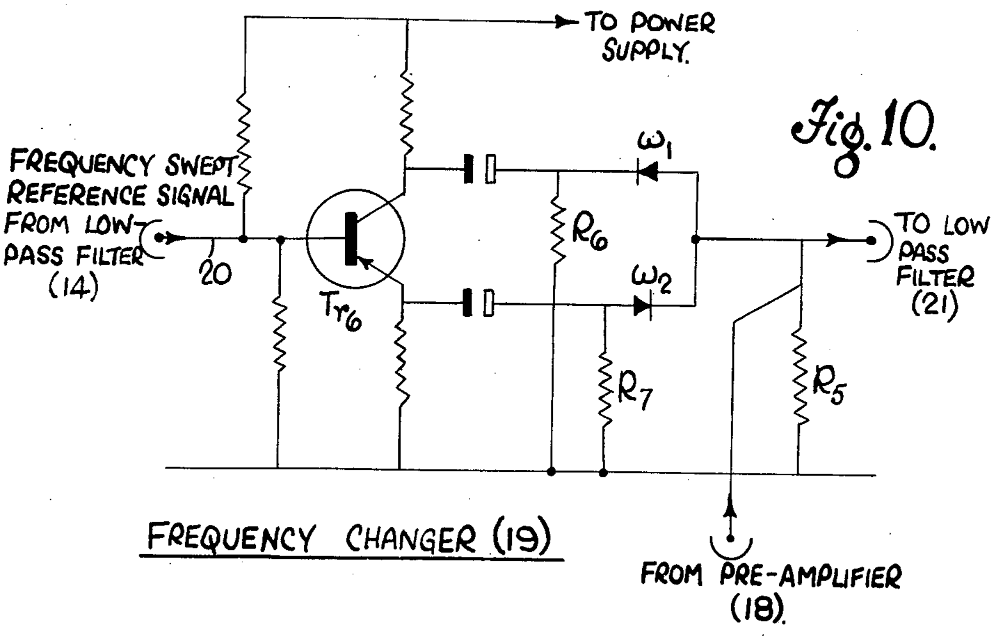
FIGURE 10 is a circuit diagram of one suitable form of frequency changer for incorporation in each of the receiving signal channels.

The frequency changer shown in FIGURE 10 may comprise a rectifier shunt modulator having a transistor $Tr_6$ of which the base circuit is fed with the locally generated signal along the feed line 20 and of which the collector-emitter circuit contains rectifiers $w$, $w_2$ (for example, of the germanium type) connected to an output resistor $R_5$ to which is also fed the incoming signal delivered from the pre-amplifier, concerned.

The resistive value of $R_5$ should be much higher than the resistive value of the resistors $R_6$ and $R_7$.

The manner of operation of this type of circuit when using thermionic values is well understood and for this purpose reference may be had to the publication "Rectifier Modulators," by D. G. Tucker, published by McDonald & Co. Ltd., London. The substitution of transistors does not affect the principle of operation.

Figure 11:
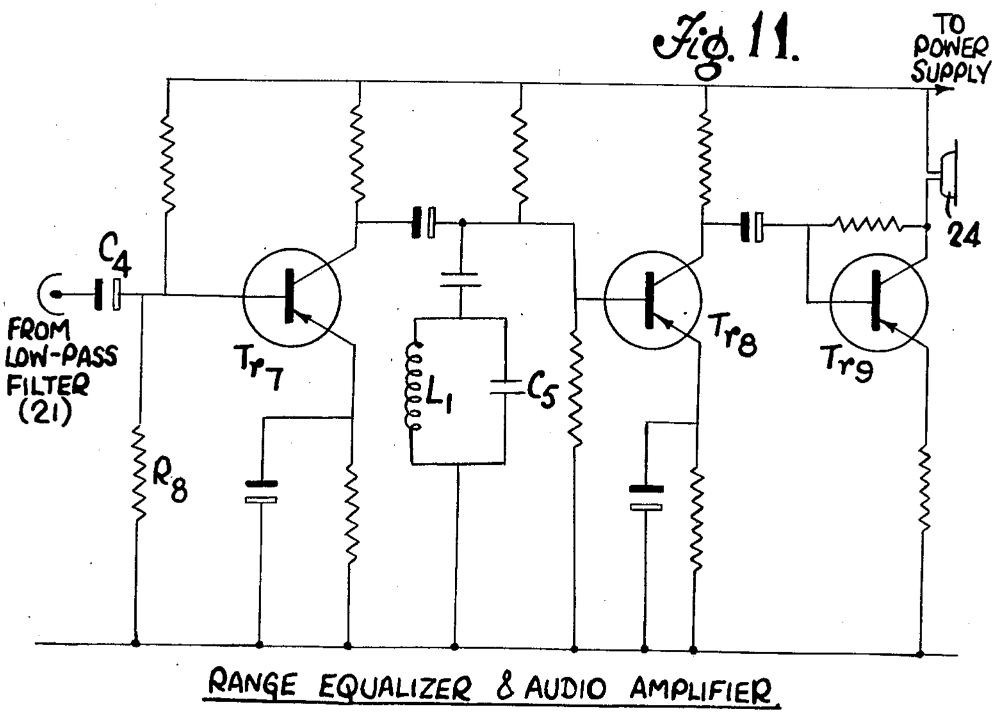
FIGURE 11 is a circuit diagram of one suitable form of range equalizer and audio amplifier for incorporation in each of the signal channels.

The range equalizer units of which one is shown in FIGURE 11 may comprise a transistor amplifying stage in which a transistor $Tr_7$ is fed from the output of the associated filter 21 through a circuit providing low frequency cut off below 100 cycles per second, the values of the capacitor $C_4$ and the input impedance being chosen for this purpose.

The collector circuit of $Tr_7$ is connected to a parallel tuned circuit $L_1C_5$ which is designed to be resonant in the region of 4 kc./s., and has a (Q) in the region of 2 to 6 depending upon the maximum range for which the apparatus is set for the time being.

Transistor $Tr_8$ is resistance-capacity coupled to transistor $Tr_7$ the value of current in the base circuit of $Tr_8$ depending upon the frequency of the signal (dependent upon the range of the object), the arrangement being such that inequalities in base current due to change in frequency tend to be reduced in comparison with what would occur were the resonant circuit $L_1C_5$ omitted.

The transistor $Tr_8$ feeds a further amplifying transistor circuit $Tr_9$ forming the audio amplifier unit 23 which in turn is connected to the associated ear phone 24.

It will be understood that the circuit diagram shown in FIGURES 6 to 11 are given by way of example and may be modified as appropriate to meet particular requirements dependent upon the use to which the apparatus is put, in which case reference may be had to publications dealing with the design of transistor circuits, for example, as the publication entitled "Handbook of Transistor Circuits," published by Mullard Limited, Mullard House, Tollington Place, London, W.C. 1.

The low pass filters 14 and 21 may be of conventional design, the filter 14 in the present case having a cut off frequency of 60 kc./s. and the filters 21 having a cut off frequency of 4 kc./s. The design of such filters is disclosed for example in "Radio Engineers Handbook," by F. E. Terman, published by the McGraw-Hill Book Company Incorporated, New York, 1943, chapter 2.

Although in the foregoing description which refers to the illustrated form of the invention, the indicator means have been of the type furnishing an audible output which indicates the range, and the bearing or direction, of the object, and such form of indication means would be suitable not only for blind persons but also for other users in applications of the apparatus where it is required to detect and locate objects under conditions of poor visibility and where the user has his or her visual senses otherwise engaged, it will be understood that in certain circumstances a visual indicator means may be substituted for the aural indicator means.

In this case a measuring or indicating instrument responsive to the frequency of the signal furnished by each of the audio amplifiers could be provided.

Figure 12:
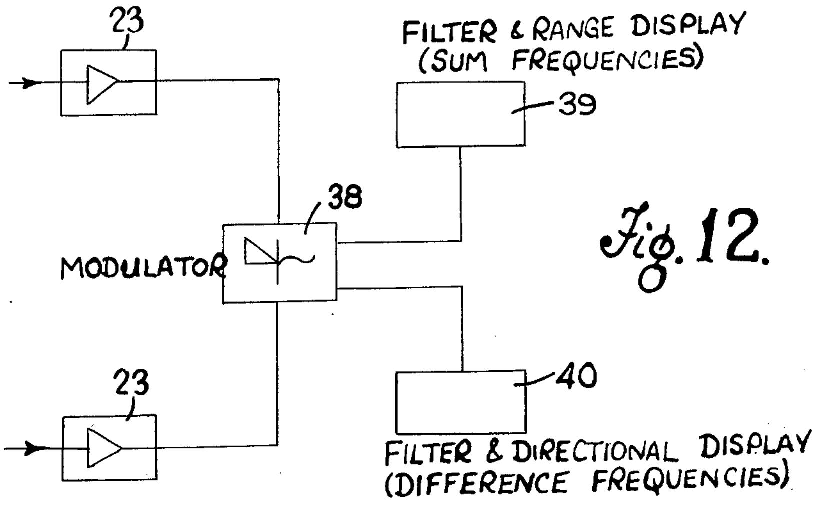
FIGURE 12 is a schematic circuit diagram showing modified form of indicator means affording a visually readable display.

A circuit diagram showing schematically an arrangement of this kind is shown in FIGURE 12.

The audio amplifiers 23 of the respective channels feed a modulator 38 from which are derived two outputs fed to units 39 and 40, and each including sum and difference frequencies resulting from multiplication of the frequencies proceeding down the two channels which feed into the modulator.

The unit 39 may comprise a plurality of filters which are pre-tuned to accept relatively narrow pass bands lying in the range of the sum frequency and the output terminals of these filters may be connected to a sampling switch which is operated to connect each in succession to a display device such as a cathode ray tube in which the time base is synchronised with the position or setting of the sampling switch.

Thus, output from the particular filter which responds will appear at a particular position on the time base which will be a function of the range of the signal since this is proportional to the average and hence the sum of the two frequencies fed into the modulator 38.

The unit 40 may be of similar form, except that the pre-tuned filters in this case will be responsive to difference frequency bands within the difference frequency range, and response of a particular filter will therefore indicate a particular object direction in relation to the reference axis of the receiving elements 17.

Again, the output from the filters of the unit 40 may be connected in succession through the intermediary of a sampling switch to a display device, such as a cathode ray tube, in which the time base is synchronised with the position or setting of the sampling switch.

If desired, a single display may be utilised in which range signals derived from the outputs of the filters of the unit 39, and direction signals derived from the outputs of the filters in the circuit 40, are fed to a single display device having time bases representing positional co-ordinates, for example X and Y axes as in the known "B" type display.

What I then claim is:

1. Apparatus for detecting the presence of an object by reflection of wave energy comprising, means for generating a carrier wave, means for varying the frequency thereof cyclically through a range of values, means for radiating said carrier wave to a field of view, means for receiving reflections of said carrier wave from an object in said field of view including two receiving elements having directional receptivities represented by polar lobes both extending forwardly into said field of view, the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and differs for the two channels whenever the object is offset laterally from said reference axis, and means for presenting said beat signals in a form in which frequency disparity between said beat signals in said two channels is readable.

2. Apparatus for detecting the presence of an object by reflection of acoustic wave energy comprising, means for generating a carrier wave, means for varying the frequency thereof cyclically through a range of values, means for radiating acoustic wave energy of the frequency of said carrier wave to a field of view, means for receiving reflections of said carrier wave from an object in said field of view including two receiving elements having directional receptivities represented by polar lobes both extending forwardly into said field of view, the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and which differs for the two channels whenever the object is offset laterally from said reference axis, means in each of said channels for passing only beat signals of less than a predetermined difference frequency, and means for presenting said beat signals in a form in which frequency disparity between said beat signals in said two channels is readable, said range of values through which said carrier wave frequency is varied being a plurality of times greater than the value of said predetermined difference frequency.

3. Apparatus for detecting the presence of an object by reflection of acoustic wave energy, means for generating a carrier wave, means for frequency modulating said carrier wave in accordance with a saw tooth frequency-time characteristic to sweep said carrier wave through a range of frequencies, means for radiating acoustic wave energy of the frequency of said modulated carrier wave to a field of view, means for receiving reflections of said acoustic wave energy from an object in said field of view including two receiving elements having directional receptivities represented by polar lobes both extending forwardly into said field of view the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and which differs for the two channels whenever the object is offset laterally from said reference axis, means in each of said channels for passing only beat signals of less than a predetermined difference frequency, and means for presenting said beat signals in a form in which frequency disparity between said beat signals in said two channels is readable, said range of frequencies through which said carrier wave is swept being a plurality of times greater than the value of said predetermined difference frequency.

4. Apparatus for detecting the presence of an object by reflection of wave energy comprising, means for generating a carrier wave, means for varying the frequency thereof cyclically through a range of values, means for radiating said carrier wave to a field of view, means for receiving reflections of said carrier wave from an object in said field of view including two receiving elements having directional receptivities represented by polar lobes both extending forwardly into said field of view the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and which differs for the two channels whenever the object is offset laterally from said reference axis, and means for audibly reproducing said beat signals including separate aural indicator elements connected respectively to said two channels for application to left and right ears of a user.

5. Apparatus for detecting the presence of an object by reflection of wave energy comprising, means for generating a carrier wave, means for varying the frequency thereof cyclically through a range of values, means for radiating said carrier wave to a field of view, means for receiving reflections of said carrier wave from an object in said field of view including two receiving elements spaced apart laterally of a reference axis extending longitudinally of the field of view, and having directional receptivities represented by polar lobes extending forwardly into said field of view on both sides of said reference axis, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and which differs for the two channels whenever the object is offset laterally from said reference axis, means for audibly reproducing said beat signals including separate aural indicator elements connected respectively to said two channels for application to left and right ears of a user, and a mounting member including head engaging side portions and a front portion shaped to interfit with the user's head so as to retain the mounting member thereon in a fixed postion, said receiving elements being carried by said front portion of said mounting member at positions thereon situated adjacent to respective side portions.

6. Apparatus for detecting the presence of an object by reflection of wave energy comprising, means for generating a carrier wave, means for varying the frequency thereof cyclically through a range of values, means for radiating said carrier wave to a field of view, means for receiving reflections of said carrier wave from an object in said field of view including two receiving elements spaced apart laterally of a reference axis extending longitudinally of the field of view, and having directional receptivities represented by polar lobes extending forwardly into said field of view on both sides of said reference axis, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels, means for audibly reproducing said beat signals including separate aural indicator elements connected respectively to said two channels for application to left and right ears of a user and, a spectacle frame-shaped mounting member including laterally spaced side arms, a front piece connected thereto and incorporating eye-frames, and a bridge piece connecting same, said receiving elements being mounted respectively in said eye-frames.

7. Apparatus according to claim 6 in which said means for radiating said carrier wave is supported by said bridge piece.

8. Apparatus for detecting the presence of an object by reflection of wave energy comprising, means for generating a carrier wave, means for varying the frequency thereof cyclically through a range of values, means for radiating said carrier wave to a field of view, means for receiving reflections of said carrier wave from an object in said field of view including two receiving elements having directional receptivities represented by polar lobes both extending forwardly into said field of view, the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and differs for the two channels whenever the object is offset laterally from said reference axis, means for audibly reproducing said beat signals including separate aural indicator elements connected respectively to said two channels for application to left and right ears of a user, and a spectacle frame-shaped mounting member including laterally spaced side arms, a front piece connected thereto and incorporating eye-frames, and a bridge piece connecting same, said receiving elements being mounted respectively in said eye-frames, and said aural indicator elements being mounted respectively at rearward extremities of said side arms.

9. Apparatus for detecting the presence of an object by reflection of wave energy comprising, means for generating a carrier wave, means for varying the frequency thereof cyclically through a range of values, means for radiating said carrier wave to a field of view, means for receiving reflections of said carrier wave from an object in said field of view including two receiving elements having directional receptivities represented by polar lobes both extending forwardly into said field of view, the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and differs for the two channels whenever the object is offset laterally from said reference axis, and, frequency responsive means including a circuit responsive to the difference of frequency between said beat signals in said channels respectively, a circuit responsive to the average value of frequency of said beat signals in said channels at any instant, and display means for visually displaying output from the first said circuit to furnish directional information and for visually displaying output from the second said circuit to furnish range information.

10. Apparatus for detecting the presence of an object by reflection of acoustic wave energy comprising means for generating a carrier wave, means for varying the frequency thereof cyclically through a range of values, means for radiating acoustic wave energy of the frequency of said carrier wave to a field of view, means for receiving reflections of said wave energy from an object in said field of view including two receiving elements having directional receptivities represented by polar lobes both extending forwardly into said field of view, the latter having a medial longitudinally extending reference axis, means for mounting said receiving elements at positions spaced apart laterally of said reference axis with unobstructed access for reception at both of said elements of signals from every part of said field, two receiving channels connected respectively to said receiving elements, modulator means in each of said channels, means for feeding a local signal to each of said modulator means of a frequency varying cyclically in conformity with that of said carrier wave to heterodyne with an incoming signal in each of said channels and produce respective beat signals therein of a difference frequency varying through a range of values as the range of the object varies from maximum to minimum and which differs for the two channels whenever the object is offset laterally from said reference axis, and means for presenting said beat signals in a form in which frequency disparity between said beat signals in said two channels is readable, said range of values through which said carrier wave frequency is varied being a plurality of times greater than that through which said difference frequency varies.

11. An aid for a blind person for detecting the presence of an object comprising, transmitting means for generating an electrical carrier wave signal of ultrasonic frequency, means for frequency modulating said carrier wave signal in accordance with a saw-tooth frequency-time characteristic to sweep said carrier wave through a range of frequencies whereof the highest value is at least one half an octave higher than the lowest value, transducer means connected with said transmitting means for radiating acoustic wave energy of the frequency of said carrier signal to a field of view and for receiving a reflection of said acoustic wave energy from an object therein, receiving means also connected with said transducer means for receiving therefrom an incoming electrical signal of the frequency of said reflection and including at least one receiving channel, modulator means in said channel, means for feeding a local electrical signal to said modulator means of a frequency varying cyclically in conformity with that of said carrier wave signal to heterodyne with said incoming signal and produce a beat signal of difference frequency proportional to the range of the object and varying through a range of values as the range of said object varies from maximum to minimum, filter means in said channel for passing in a single continuous band only beat signals of less than a predetermined frequency corresponding to said maximum range down to those corresponding to said minimum range, the former having a value a plurality of times smaller than said range of values through which said carrier wave signal is varied, means for presenting said beat signal, consisting only of sound reproducing means, connected to said filter means for generating an audible signal of the frequency of all of said beat signals concurrently passed by said filter means, and portable mounting means movable by said person into different orientations and carrying at least said transducer means.

References Cited by the Examiner

UNITED STATES PATENTS

| | | | |
|---|---|---|---|
| 2,451,822 | 10/48 | Guanella | 343—12 |
| 2,474,918 | 7/49 | Slaymaker et al. | 340—3 |
| 2,724,817 | 11/55 | Hisserich | 340—3 |
| 2,834,955 | 5/58 | Tanner et al. | 343—14 |
| 2,939,135 | 5/60 | Beckerich et al. | 343—14 |
| 2,977,568 | 3/61 | Roshon et al. | 340—3 |
| 2,996,711 | 8/61 | Heiser | 343—105 |
| 3,024,441 | 3/62 | Saxton | 340—3 |

OTHER REFERENCES

"Portable Airplane Detector Worn by Spotter," Popular Mechanics, June 1942, page 45 relied on.

A Textbook of Sound, by A. B. Wood, The Macmillan Co., 1955 (page 400 relied on).

CHESTER L. JUSTUS, *Primary Examiner.*